Patented May 19, 1953

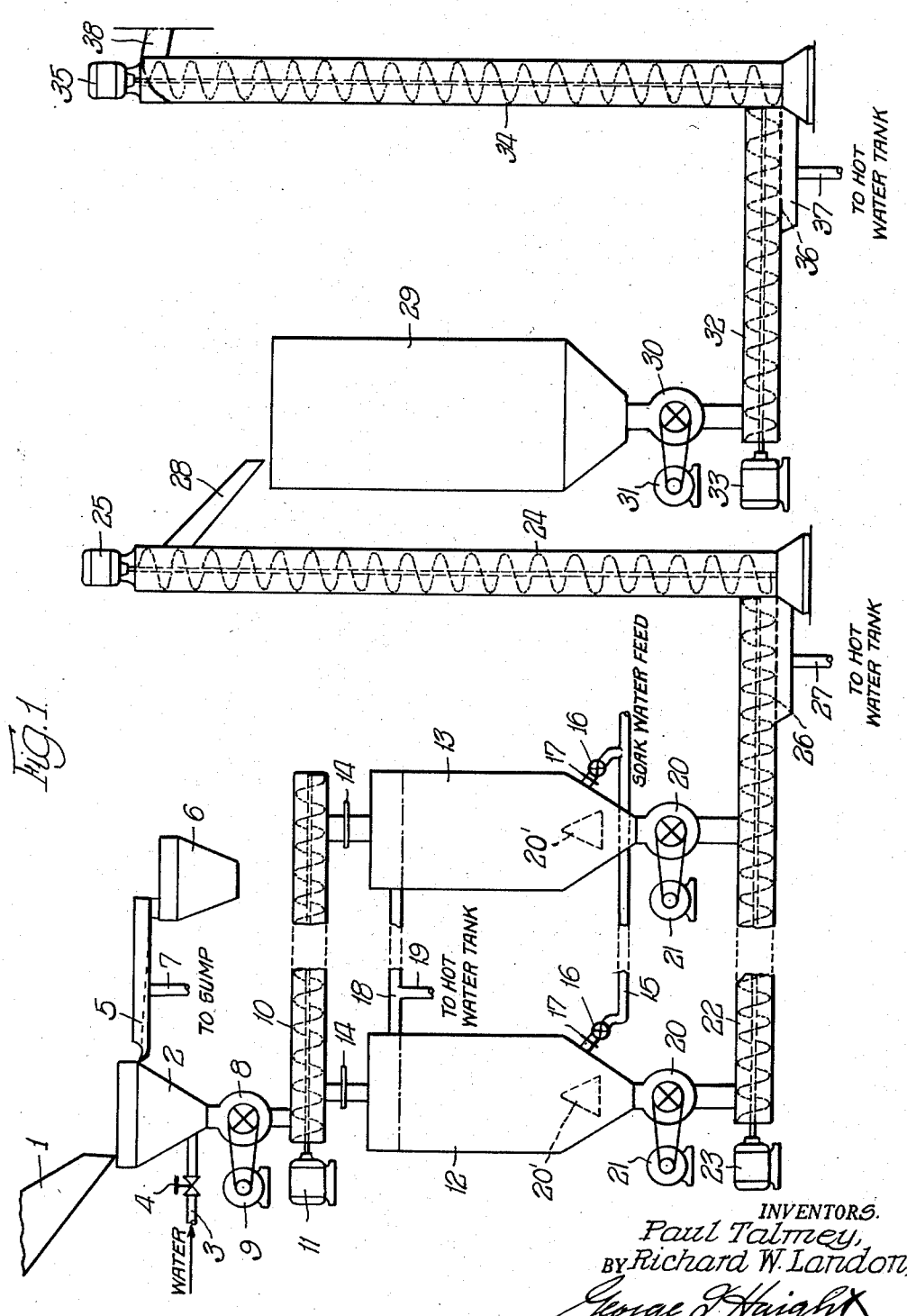

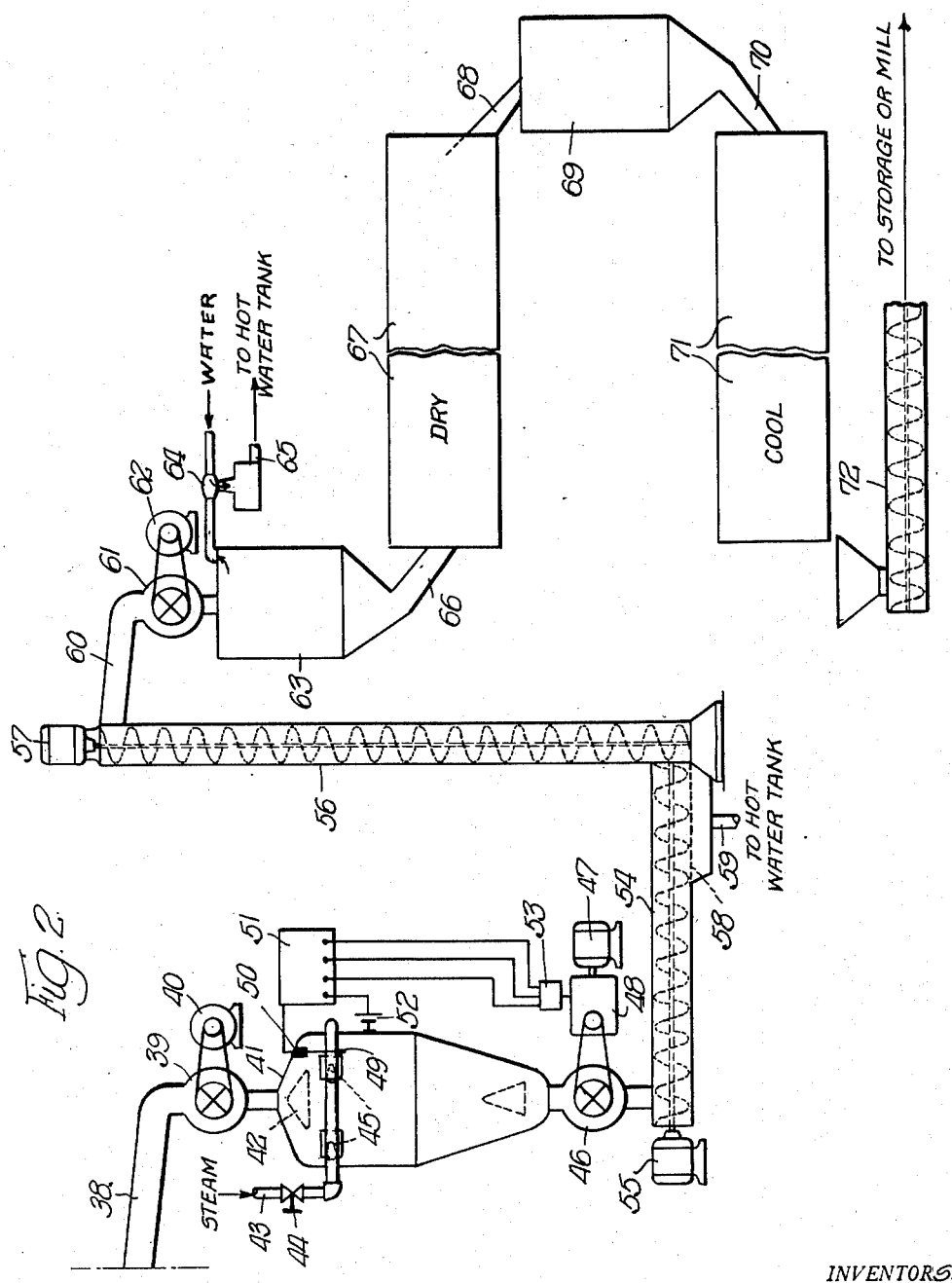

2,638,837

UNITED STATES PATENT OFFICE 2,638,837

APPARATUS FOR TREATING GRANULAR MATERIAL IN A CONTINUOUS PROCESS

Paul Talmey and Richard W. Landon, Chicago, Ill., assignors to General American Transportation Corporation, Chicago, Ill., a corporation of New York Application April 26, 1948, Serial No. 23,226

5 Claims. (Cl. 99—237)

This invention relates to apparatus for treating granular materials in a continuous process, and has for its principal object the provision of a new and improved apparatus of this kind.

It is a main object of the invention to provide an apparatus for treating granular material in a continuous process through the steps of grading the material, steeping, cooking, drying, and cooling the same, wherein the conditions to which the material is subjected are accurately controlled at all stages of the process.

Another object of the invention is to provide apparatus for treating granular material, wherein the material, though soaked, is treated so as to reduce the entrained liquid content thereof to a minimum.

Another object of the invention is to provide an improved autoclave wherein granular material is pressure-cooked under accurately controlled conditions.

Another object of the invention is to provide apparatus for treating granular material in a continuous process, which can be manufactured economically and operated and maintained in proper working condition at low cost.

Further objects of the invention not specifically mentioned here will be apparent from the detailed description and claims which follow, reference being had to the accompanying drawings in which a preferred embodiment of the invention is shown by way of example and in which:

Fig. 1 is a diagrammatic view illustrating the steps of grading, steeping, and dewatering of the material; and Fig. 2 is a diagrammatic view illustrating the steps of pressure-cooking, flash-steaming, drying, and cooling the material.

Many granular materials such as cereals, wood pulps, and the like, are treated by soaking, steaming, etc., to prepare them for subsequent processing to produce a final product from the material. Many grains, rice for example, are treated by soaking and heating preparatory to milling or otherwise processing the material to form a product for human consumption. Wood chips and the like are likewise treated through the steps of soaking and cooking to disintegrate the granules into individual fibers which may be used in the manufacture of paper and other fibrous products. The apparatus of the present invention is adapted to such uses.

Heretofore, insofar as we are aware, treatment of granular material in the foregoing manner has been carried on principally by batch processes, wherein a given quantity of material is put through successive steps of the processes as a unit, and in certain instances where the granular material has been mixed with and maintained in an admixture or solution of liquid, usually water, the processes have been continuous. The present invention provides an apparatus for carrying out the same, wherein the granular material is subjected to the step of grading to remove under-developed and faulty granules preferably by a flotation-separation process. The firm and normal weight granules are then steeped by immersion in liquids that are maintained at a desired temperature, and the steeping continued for a definite period of time to effect certain chemical and mechanical changes in the granules.

The steeped material is then subjected to the step or steps of dewatering to the end that the entrained water content thereof is reduced to a minimum and the steeped material is then passed into an autoclave where it is subjected to a higher temperature and pressure for a definite period of time to effect further chemical and mechanical changes in the granules. The thus cooked material is then dehydrated in one or more steps, one of the steps preferably including flash-steaming which quickly reduces surface moisture to a minimum, after which drying down to a desired moisture content is accomplished and the dried material cooled to prepare it for subsequent operations.

Referring now to the drawings in more detail, granular materials such as grain, for example, are stored in a suitable bin, not shown, and introduced into the process and apparatus of the present invention through suitable means such as a chute 1. This chute discharges the material into a grading device which, in the example shown, consists of a tank 2, into which the material falls. A liquid, such as water, is admitted to the bottom of the tank through suitable connections 3 under the control of a valve 4 and passes upwardly through the material, carrying with it granules which are light because of under-development, decay, and the like, as well as straws and other waste material, all of which have a lower density than the sound grain. This undesirable material floats with the surplus water out of the top of the separator into a suitable chute 5 which discharges into a storage bin 6 from which the material is subsequently withdrawn and put to such further uses as may be suitable to it. Excess water flowing out of the separator 2 is returned through suitable piping 7 to a sump or tank from which it is withdrawn for further use.

Located at the bottom of the separator 2 is a measuring device 8 which, for the purpose of illustration, is shown as a star valve that is driven at a constant speed by a suitable source of power such as the motor 9, so as to pass a measured quantity of material on to the apparatus that performs the next step in the process. As shown, the star valve is belt-driven, but it is contemplated that the source of power 9 may be connected to the valve through suitable gearing which serves also to reduce the speed of the valve down to the desired value. Solid material that has settled to the bottom of the separator 2 is thus removed and discharged into a suitable conveyor 10, shown as a screw conveyor, driven at a constant rate of speed by a suitable source of power such as the motor 11. As shown, the motor is directly connected to the screw, but, as will be understood by those skilled in the art, suitable reduction gears will be employed.

The conveyor 10 conducts the material into one of a plurality of steeping tanks of which two tanks 12 and 13 are shown, the tank to which the material is referred being determined by suitable means such as gate valves 14 which are opened, one at a time, to permit the material to pass from the conveyor into the selected tank.

The number and size of the tanks, such as 12 and 13, will depend upon the details of the process to be carried out by the equipment. Preferably each tank has sufficient capacity to hold all of the material that the equipment is designed to process in a given unit of time, an hour for example, and the number of tanks provided is made to correspond with the number of hours that the material is to be subjected to the steeping process. Equipment for emptying the tank is provided to have such capacity as to require the same unit of time to empty the tank as was required for filling, so that the steeping time to which the material is subjected can be readily controlled.

Each of the tanks, such as 12 and 13, receives the steeping liquid, usually water, from a header 15, through a control valve 16 and an orifice 17. Water maintained at the desired temperature is supplied to the header at a definite pressure by suitable means, not shown, and when the valve 16 is opened to permit this water to pass through the orifice 17 the rate of flow of water will be uniform in all of the tanks. Water thus admitted to the steeping tanks rises through the material therein and flows out of the top thereof through suitable drains 18, from which it is carried by piping 19 to a sump or tank from which it is drawn for further use. The material level in the tank is maintained below that of the drains 18 so that none of the material passes out of the tank with the water.

Located at the bottom of each of the steeping tanks is an ejecting device which, in the example shown, also consists of a star value 20 driven by a suitable source of power such as the motor 21. Other suitable devices for removing material from the tanks at a uniform and measured rate may be provided within the teachings of the invention. Within each tank and near the bottom thereof is a suitable means such as a baffle 20' to prevent funneling of the material from the center of the tank.

The extracting devices 20 discharge into a suitable conveyor shown as a screw conveyor 22, that is driven by a suitable source of power such as a motor 23, and serves to convey the material to a vertical screw lift 24 that is driven by a suitable source of power such as a motor 25. The casing of the conveyor 22 is provided with drain openings 26 through which entrained water discharged from the steeping tanks with the material is drained off and carried by suitable piping 27 to a sump or tank from which it is withdrawn for further use. While a screw conveyor is preferable and lends itself well to the draining of liquid from the granular material, other types of conveyors may be used within the teachings of the invention.

The granular material is discharged from the vertical screw lift through a suitable duct 28 into a surge tank 29 which serves merely to insure that a supply of material will always be at hand for introduction into the pressure apparatus of the system. If it could be guaranteed that the flow of material from the steeping tanks would be maintained constant at all times, the use of surge tank 29 might be eliminated; however, the operator of the equipment may not shift from one steeping tank to another precisely at the instant that the former tank is completely emptied, and consequently there may be short intervals of time when no material is flowing into the surge tank 29. This tank retains a sufficient quantity of material to tide over such intervals, thereby insuring that there will always be available a quantity of material for uniform movement through the pressure system.

Located at the bottom of the surge tank is a suitable extracting device shown as a star valve 30, driven by a suitable source of power 31 which removes material at a uniform measured rate and discharges it into a conveyor 32 shown as a screw conveyor driven by a suitable source of power 33, which screw conveyor 32 discharges into a vertical screw lift 34 that in turn is driven by a suitable source of power 35. The casing of conveyor 32 contains drain ports 36 through which any water that may still be entrained in the material is drained off and conducted through suitable piping 37 to a sump or tank from which it is withdrawn for further use. The vertical screw lift 34 discharges through a suitable duct 38 to a measuring device shown as a start valve 39 that is driven by a suitable source of power such as the motor 40. The casings of the conveyor 32, vertical screw lift 34, duct 38, and star valve 39 are all made pressure-tight so that the pressure within these devices may be maintained at a value other than atmospheric, as will presently appear.

The measuring device 39 functions to determine the rate of flow of the granular material into the autoclave, and while this device normally operates at a constant speed so as to maintain a uniform rate of flow of material, this speed may be varied so as to vary the quantity of material treated per unit of time. The star valve 39 serves primarily as a pressure seal and ordinarily will be run at such a speed as will enable it to handle even more material per unit of time than it receives from the device 30; that is to say, the rate of flow of material into the autoclave is controlled solely by the device 30 rather than by the combined action of devices 30 and 39.

Star valve 39 discharges into an autoclave 41 preferably consisting of a generally cylindrical pressure-tight container or tank disposed with its axis vertical. The granular material on entering the tank falls upon a suitable means, such as a baffle 42, which serves to break up any matted together granules that may appear, it being preferable that insofar as possible the granules within the autoclave shall be individual and each completely separated from the other.

Steam from a suitable source, not shown, is admitted through piping 43 under the control of a valve 44 to tangentially disposed nozzles 45, one or more of which are located around the perimeter of the tank at points just below the baffle or breaking-up means 42. Steam emitted from these nozzles will travel in a path substantially tangentially of the walls of the autoclave and will engage the granular material as it falls off of the breaking-up device 42 and will impart a whirling motion to that material, which motion serves to further break up masses therein and to distribute the material substantially uniformly across the tank. The pressure and temperature to be maintained in the autoclave will depend upon the requirements of the particular material being processed. In the case of cereals, low pressures may prevail. In the case of wood products being digested into pulp, higher pressures will ordinarily be used. In some instances the pressures may be as high as one hundred fifty pounds.

With measuring devices 30 and 39 running at a uniform speed, and with an ample supply of granular material maintained in the surge tank, the material will be fed into the autoclave at a constant rate of speed. Each time the star valve operates, a small quantity of steam will pass from the autoclave through the star valve into the pressure-tight conveying system; however, this steam will be at a temperature relatively higher than the system and material in it, with the result that although the pressure in the conveying system will rise above atmospheric pressure it ordinarily will not be as high as the pressure in the autoclave. In instances where the apparatus is run for long periods of time without shutdown, and under conditions minimizing the loss of heat, the conveyor system may eventually build up a pressure approximately equalling that of the autoclave. In instances where the autoclave is operated at high pressures, more than one device, such as the star valve 39, may be employed at the outgoing end of the conveying system, and if necessary suitable vents may be provided to enable controlling the pressure within the conveying system, the plurality of valves serving as a pressure lock.

Located at the bottom of the autoclave is an extracting device, also shown as a star valve 46, that is driven by a suitable source of power such as a motor 47, through a suitable variable speed-reducing device 48, so that the rate of extracting of the processed material from the autoclave can be accurately controlled.

In most processes, the time during which the material is subjected to the heat and pressure in the autoclave is of the utmost importance, and it is therefore necessary to maintain accurate control so that the length of time that the material is in the autoclave will be accurately determined. To this end, in the device shown, the extracting valve 46 is designed to be operated between limits which are just above and just below the rate of flow of the material. Thus, for example, if the feeding devices 39 and 30 are set to operate so as to inject ten cubic feet of material per minute into the autoclave, extracting device 46 may be adjusted to operate at a lower limit of nine cubic feet per minute and an upper limit of eleven cubic feet per minute.

Located in the top of the tank is a rod 49 that extends down to the plane in which it is desired to maintain the upper level of the material in the autoclave. This rod 49 is insulated by suitable means 50 from the walls of the tank and connected electrically to a control device 51 that is connected through a suitable source of power, diagrammatically illustrated as a battery 52, to the walls of the tank. The control device so illustrated may consist of a relay which will be operated when the level of the material in the autoclave builds up to such a height that it engages the bottom end of the contact rod 49, thereby closing a circuit from the walls of the autoclave through the material and rod to the relay in the control device. This relay will then operate and close circuits for the control 53 of the variable speed drive 48, operating that control to increase the speed of the extracting valve 46 from the lower to the upper limit. Material will then be extracted from the autoclave at a rate slightly greater than the incoming rate, with the result that the level of the material will fall. As soon as this level has fallen sufficiently to break the engagement of the material with the contacting rod 49, the control relay device 51 will re-operate to reset the speed-reducing device 48 to the lower limit, whereupon the level of material in the autoclave will start rising again. By proper adjustment of the limits of rate of operation of the withdrawal valve 46 and the sensitivity of the control devices, the level of the material in the autoclave can be maintained constant within narrow limits, and consequently the length of time that the material is subjected to the steam in the autoclave can thus be accurately controlled. The particular type of control equipment employed for this purpose is not of the essence of the present invention, as there are a number of suitable devices available upon the open market which may be employed and operated to produce the results sought, within the teachings of the invention.

Processed materials extracted from the autoclave by the valve 46 are discharged into a conveyor 54 which is driven by a suitable source of power, such as the motor 55, and discharges into a vertical screw lift 56 which is driven by a suitable source of power 57. The conveyor 54 and vertical screw lift are similar in construction to the conveyor and lift 32 and 34, respectively, and are encased in pressure-tight housings. Conveyor 54 is provided with drain openings 58 through which condensate entrained in the treated material is drained off and conducted through suitable piping 59 to a sump or tank from which it is withdrawn for further use in the system.

The vertical screw lift 56 discharges through a suitable pressure-tight duct 60 into an extracting device, such as star valve 61, which is driven at a constant rate of speed by a suitable source of power such as the motor 62.

Since the conveyor 54, vertical screw lift 56, and discharge duct 60 are pressure-encased, pressure therein may build up to a point approximately equal to that in the autoclave, although in most instances the pressures within these devices, while above atmospheric, will be below the autoclave pressure.

Extracting device 61 serves primarily as a pressure seal rather than a measuring device and will be operated at such a speed as to enable it to handle the material at the maximum rate that valve 46 delivers it to the conveyors. The rate of flow of the material out of the autoclave is therefore under the sole control of valve 46 rather than under the joint control of devices 46 and 61. In instances where pressure in the autoclave is practically atmospheric, star valves 30 and 61 may be eliminated entirely.

Extracting valve 61 discharges into a flash-steaming tank 63 which is maintained at a reduced pressure by a suitable aspirating device 64 which functions to drain off vapors released from the material and to condense those vapors which are collected and conducted by suitable piping 65 to the sump or tank from which they are withdrawn for further use in the apparatus. The sudden reduction of pressure on the material which is at a relatively high temperature, will cause flash-steaming of condensate that may be adhering to the outer surfaces of the granules. The flash-steaming tank 63 is not air-tight, and there may be a certain flow of air through the material, which flow will aid in removing as much of the moisture as possible from the material.

The flash tank discharges through a suitable duct 66 into a drier 67 may conveniently be a drum type rotary drier of suitable capacity. The material is dried down to a desired moisture content in this drier and discharged therefrom through a duct 68 into a surge bin 69, from which it is withdrawn through a duct 70 and passed into a cooling device 71 which may be similar in construction to the drier. The material is cooled down to a point at or near room temperature and discharged from the cooler into a suitable conveyor 72 which conducts it into bins where it can be stored preparatory for the next step in the process to which the material is to be subjected. The particular construction of the drying and cooling equipment is not of the essence of the present invention as there are available on the open market many devices suitable for use herein.

In certain instances where the reduction in the moisture content in the product must be gradual, two or more sets of equipment may be employed and the material put through a first drier which removes approximately fifty per cent. of the total amount of moisture to be removed from it, and the material then passed into a suitable cooler and from it to a tempering tank wherein the material is allowed to stand for a period of time sufficient to equalize the moisture content of the inside and outside portions of the granules, after which the material is again dried to remove the remainder of the moisture that must be removed to bring it down to a desired content, and cooled as above.

The foregoing equipment may be put to use in the processing of a number of different materials, and the various controls varied to meet the requirements of the particular material. In one instance, where paddy rice is being treated, the material flows through the separator 2 which removes the unsound and light grains and certain waste materials which are floated off, dried, and employed in the making of cattle feed and the like. The sound grains are passed into one of the steeping bins where they are immersed in water that is maintained at a temperature of 200° F., the material being soaked in this water for a period of nine hours. In such an installation, nine steeping tanks may conveniently be used, each having a capacity sufficient to hold one hour's supply of the material at the rate that the plant is designed to process the material. The paddy thus steeped is conveyed through the system through the autoclave where it is subjected to steam at fifteen pounds pressure for a period of three to five minutes to effect gelatinization of the starch within the rice kernels, after which the material is extracted from the autoclave, flash-steamed to remove surface moisture, and dried down to a moisture content of approximately fifteen per cent. and cooled, and then conducted to devices for milling the paddy to remove the hulls and bran from the kernels. Rice so treated absorbs and retains much of the nutrient value contained in the hull and bran, including certain vitamins, with the result that the rice is more nutritious than untreated rice, possesses a distinctive nutty flavor, and has a color which is lighter than rice processed by methods of the prior art of which we are aware. The rice kernels so processed possess an attractive light color, rather than the characteristic brownish color of the prior art processes.

The equipment of our invention has been illustrated by showing and describing a preferred embodiment of it. The apparatus is used in carrying out a process that involves steeping and cooking, as before, with the step of dewatering the material to remove all, or substantially all, of the entrained water from it, so that the material when cooked, although containing much absorbed moisture, is relatively free of entrained moisture. The prior art methods have involved cooking the material while immersed or substantially immersed in condensate and water. The advantages of our improved apparatus reside principally in improvement in the appearance and quality of the finished product and in lower operating and equipment costs.

While we have chosen to illustrate our invention by showing and describing a preferred embodiment of it, we have done so by way of example only, as there are many modifications and adaptations which can be made by one skilled in the art within the teachings of the invention.

Having thus complied with the statutes, and shown and described a preferred embodiment of our invention, what we consider new and desire to have protected by Letters Patent is pointed out in the appended claims.

What is claimed is:

1. A pressure cooker for heating granular material in a continuous process comprising: a pressure-tight generally cylindrical tank; means at the top of said tank for moving the material into the tank against the pressure therein; baffle means fixed in said tank against which the material moves and by which the material is separated into substantially individual granule masses; steam jet means in said tank disposed in juxtaposition to said baffle means and through which steam plays on the material substantially tangentially of said tank to impart a whirling motion to the material and to distribute it substantially uniformly across the tank; a star valve at the bottom of the tank for extracting the processed material therefrom; a variable speed driving means for said valve; a contact rod projecting into said tank and terminating in the plane of the desired level of material in the tank; and means actuated by the material in said tank engaging said rod for controlling said variable speed driving means to vary the speed of operation of said star valve and thereby adjust the level of the material in the tank.

2. An autoclave for heating granular material in a continuous process comprising: a generally cylindrical pressure-tight tank disposed with its axis vertical; a star valve located above the tank; means for operating said valve at a constant speed to force the material to be treated into the tank at a uniform rate; a generally conical baffle fixed in said tank on which the material falls on entering the tank; tangentially disposed steam nozzle means located around the inside of the tank and near the lower edge of said baffle; means for admitting steam into the tank through said nozzle means, said steam striking the material falling from said baffle to disperse the same so that the material is composed substantially of individual granules which are distributed by the steam uniformly across the tank; a star valve located at the bottom of the tank; a variable speed drive mechanism for driving said latter valve to extract material from the tank; a generally conical baffle fixed in the tank above said latter star valve to prevent funneling of the material moving out of the tank; and means for varying the speed at which said drive mechanism operates said latter star valve thereby to adjust the level of material in the autoclave.

3. An autoclave for heating granular material in a continuous process comprising, a generally cylindrical tank disposed with its axis vertical; means in the top of said tank for moving material to be treated into the tank at a uniform rate of speed; means in the tank on which the material falls on entering the tank for dispersing the same; means including tangentially disposed nozzles in the tank for playing live steam on the material as it leaves said dispersing means; means at the bottom of the tank for removing treated material therefrom; a variable speed driving mechanism for operating said material removing means; and means for controlling said variable speed driving mechanism to adjust the rate of removal of the material and thereby maintain a substantially constant level of material in the autoclave.

4. An autoclave as claimed in claim 3, in which there is a contact within the autoclave engaged by the material thereby to close an electrical circuit over which adjustment of the variable speed driving mechanism is controlled.

5. A pressure cooker for heating granular material in a continuous process comprising: a pressure-tight tank; a materials introducing pressure lock at the top of said tank; baffle means in said tank below said lock; steam jets disposed in said tank in juxtaposition to said baffle means; a materials removing pressure lock at the bottom of said tank; a variable speed driving means for at least one of said locks; a contact rod projecting into said tank and terminating in the plane of the desired level of material in the tank; and means including an electrical circuit closed through said rod and the material in the tank for controlling said driving means.

PAUL TALMEY.
RICHARD W. LANDON.

References Cited in the file of this patent

UNITED STATES PATENTS

| Number | Name | Date |
|---|---|---|
| 44,151 | Ballard et al. | Sept. 13, 1864 |
| 433,399 | Elsworth et al. | July 29, 1890 |
| 1,169,599 | Barker | Jan. 25, 1916 |
| 1,346,898 | Kingsburg | July 20, 1920 |
| 1,574,210 | Spaulding | Feb. 23, 1926 |
| 2,086,181 | Bonotto | July 6, 1937 |
| 2,183,837 | Hamilton et al. | Dec. 19, 1939 |
| 2,195,165 | Choppin | Mar. 26, 1940 |
| 2,317,532 | James | Apr. 27, 1943 |
| 2,358,251 | Huzenlaub | Sept. 12, 1944 |
| 2,460,605 | Soissa | Feb. 1, 1949 |
| 2,462,019 | Bowman | Feb. 15, 1949 |
| 2,498,836 | Cross | Feb. 18, 1950 |
| 2,515,137 | Schall et al. | July 11, 1950 |
| 2,534,648 | Wilbur | Dec. 19, 1950 |

FOREIGN PATENTS

| Number | Country | Date |
|---|---|---|
| 234,921 | Switzerland | Mar. 1, 1945 |
| 691,475 | France | July 15, 1930 |
| 722,295 | Germany | Dec. 1, 1935 |